(12) United States Patent
Lu

(10) Patent No.: US 9,181,052 B2
(45) Date of Patent: Nov. 10, 2015

(54) PAPER PICKUP MECHANISM

(71) Applicant: Foxlink Image Technology Co., Ltd., New Taipei (TW)

(72) Inventor: Pei Chun Lu, New Taipei (TW)

(73) Assignee: FOXLINK IMAGE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/251,127

(22) Filed: Apr. 11, 2014

(65) Prior Publication Data

US 2015/0291377 A1    Oct. 15, 2015

(51) Int. Cl.
*B65H 9/16* (2006.01)
*B65H 3/20* (2006.01)
*B65H 5/06* (2006.01)

(52) U.S. Cl.
CPC .................. *B65H 3/20* (2013.01); *B65H 5/068* (2013.01); *B65H 9/16* (2013.01); *B65G 2207/02* (2013.01); *B65H 2301/44335* (2013.01)

(58) Field of Classification Search
CPC ........... B65H 3/20; B65H 2301/44335; B65H 2404/5391; B65G 2207/02; A47L 25/005
USPC .................. 221/210; 271/33; 414/795.4, 796.5
See application file for complete search history.

(56) References Cited

U.S. PATENT DOCUMENTS

| | | | | | |
|---|---|---|---|---|---|
| 2,919,129 | A | * | 12/1959 | Sjostrom | 271/33 |
| 3,083,961 | A | * | 4/1963 | Arbter | 271/33 |
| 3,580,564 | A | * | 5/1971 | Boynton et al. | 271/33 |
| 4,153,240 | A | * | 5/1979 | Gouley | 493/419 |
| 4,640,539 | A | * | 2/1987 | La Porte | 294/182 |
| 4,887,858 | A | * | 12/1989 | Gazzarrini | 294/212 |
| 5,007,626 | A | * | 4/1991 | Blaimschein | 271/33 |

FOREIGN PATENT DOCUMENTS

DE      10251064 A1 *  5/2004  ............. B65B 35/16

* cited by examiner

*Primary Examiner* — Patrick Cicchino
(74) *Attorney, Agent, or Firm* — Muncy, Geissler, Olds & Lowe, P.C.

(57) ABSTRACT

A paper pickup mechanism is used with a pickup tape and includes a frame, a release roller, a receive roller and a sponge. The release roller and the receive roller are rotatably mounted in the frame and apart parallel to each other. The sponge is mounted at a bottom of the frame and parallel to the release roller and the receive roller. The sponge is located at a level position below that of the release roller and the receive roller. The pickup tape is mounted to the release roller. The free end of the pickup tape rounds the bottom face of the sponge and is mounted to the receive roller. The stick face of the pickup tape against the sponge is exposed outward and opposite to the sponge.

8 Claims, 6 Drawing Sheets

PAPER PICKUP MECHANISM

BACKGROUND OF THE INVENTION

1. Field of the Invention

The present invention relates to a paper pickup mechanism capable of picking up paper piece by piece.

2. The Related Art

A paper pickup mechanism is widely used in image process devices such as fax machines, copying machines and scanners. A traditional paper pickup mechanism realizes the process of picking up paper by a buckling device or a vacuum suction device. However, the above-mentioned paper pickup mechanism sometimes picks up more than one paper or fails to pick up any paper so that will result in paper jam or judgment of no paper and cause the image process device to stop working.

In order to overcome the foregoing problems, an improved paper pickup mechanism is provided to realize the process of picking up paper by an electrostatic device. However, the paper pickup mechanism equipped with the electrostatic device costs more to result limitation of range of application.

SUMMARY OF THE INVENTION

Accordingly, an object of the present invention is to provide a paper pickup mechanism used with a pickup tape. The paper pickup mechanism includes a frame, a release roller, a receive roller and a sponge. The release roller and the receive roller are rotatably mounted in the frame and apart parallel to each other. The sponge is mounted at a bottom of the frame and parallel to the release roller and the receive roller. The sponge is located at a level position below that of the release roller and the receive roller. The pickup tape is mounted to the release roller. The free end of the pickup tape rounds the bottom face of the sponge and is mounted to the receive roller. The stick face of the pickup tape against the sponge is exposed outward and opposite to the sponge.

As described above, the paper pickup mechanism of the embodiment of the present invention realizes the process of picking up paper by the pickup tape, and utilizes the cooperation of the release roller and the receive roller to make the pickup tape pass under the sponge, so as to change the pickup tape against the sponge to a new length in time, so that make sure the pickup tape under the sponge keeps stickiness and can always pick up paper. Furthermore, the pickup tape under the sponge always sticks the uppermost piece of paper to ensure the paper pickup mechanism picks up paper piece by piece.

BRIEF DESCRIPTION OF THE DRAWINGS

The present invention will be apparent to those skilled in the art by reading the following description thereof, with reference to the attached drawings, in which.

DETAILED DESCRIPTION OF THE EMBODIMENT

Figure 1:
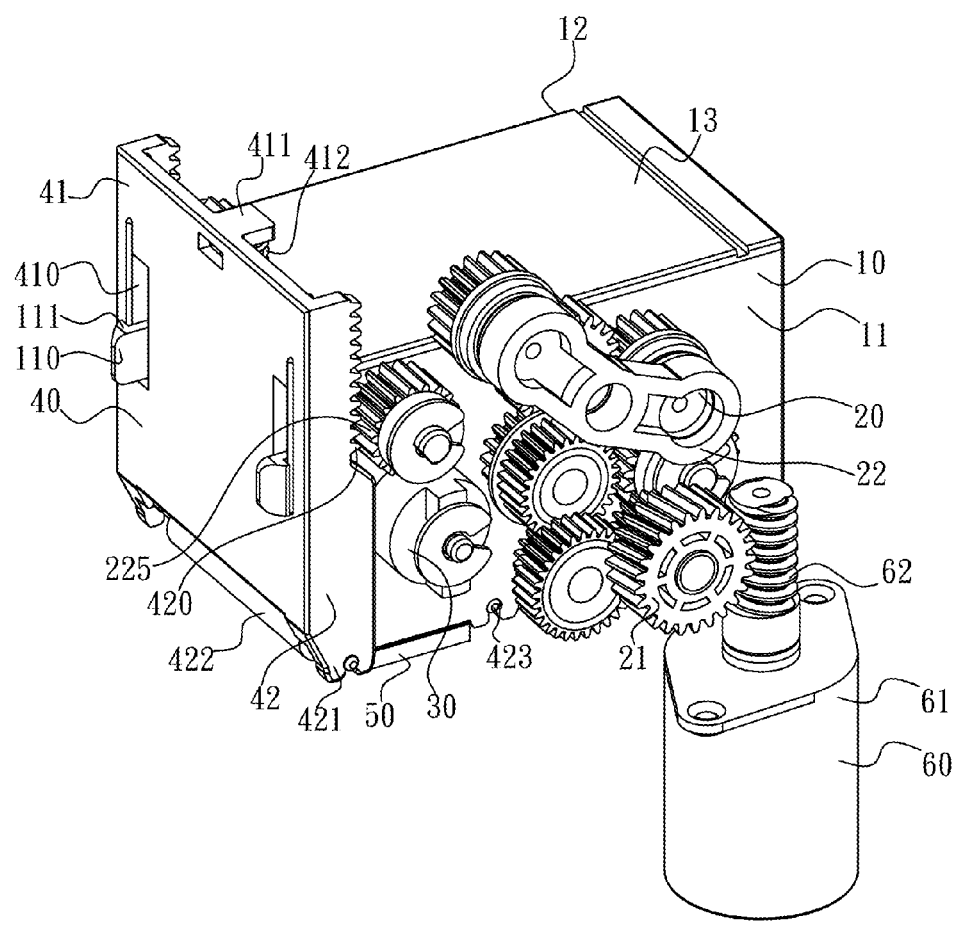
FIG. 1 is an assembled, perspective view of a paper pickup mechanism in accordance with an embodiment of the present invention.
Figure 6:
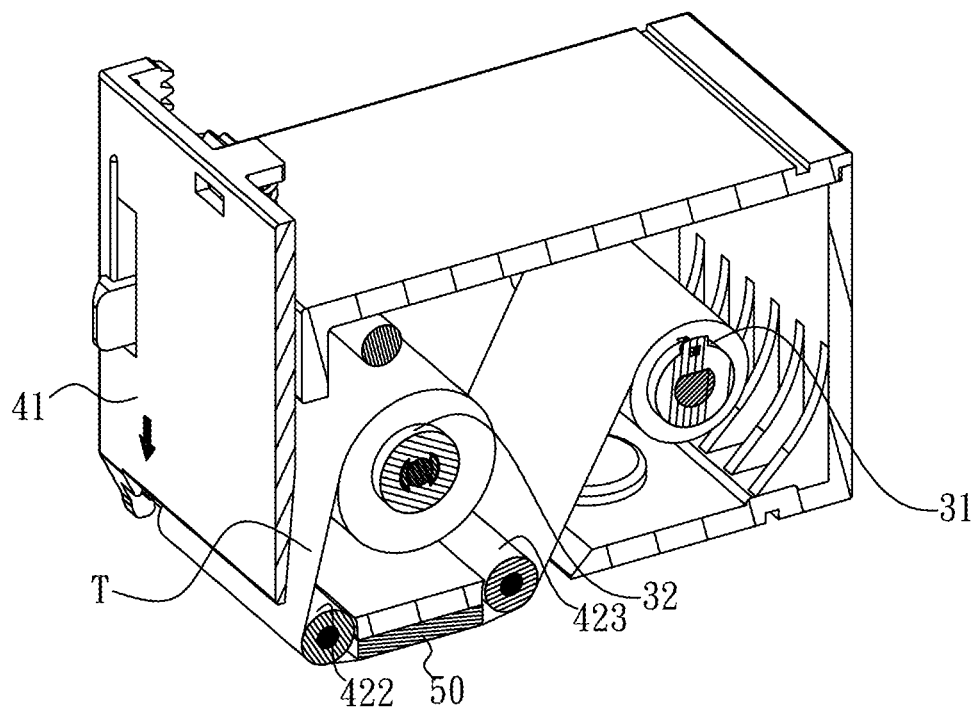
FIG. 6 is a cross-sectional view of the paper pickup mechanism used with a pickup tape shown in FIG. 1.

Referring to FIG. 1, a paper pickup mechanism 1 according to an embodiment of the present invention is adapt to being assembled in an image processing device and used with a pickup tape T (referring to FIG. 6). The paper pickup mechanism 1 includes a frame 10 as a supporting structure of the paper pickup mechanism 1, a gear assembly 20, a roller assembly 30, a lifting cover 40, a sponge 50 and a driving device 60. The gear assembly 20, the roller assembly 30, the lifting cover 40 and the sponge 50 are mounted to the frame 10. The driving device 60 is engaged with the gear assembly 20 to drive the gear assembly 20. The gear assembly 20 is further engaged with the roller assembly 30 and the lifting cover 40 to drive the roller assembly 30 and the lifting cover 40.

The frame 10 has a front wall 11, a rear wall 12 and a top wall 13 striding on the front wall 11 and the rear wall 12.

The gear assembly 20 is mounted to the front wall 11 of the frame 10 and located in front of the front wall 11. The gear assembly 20 includes a first engaged gear assembly 21 and a second engaged gear assembly 22 engaged with the first engaged gear assembly 21.

Figure 2:
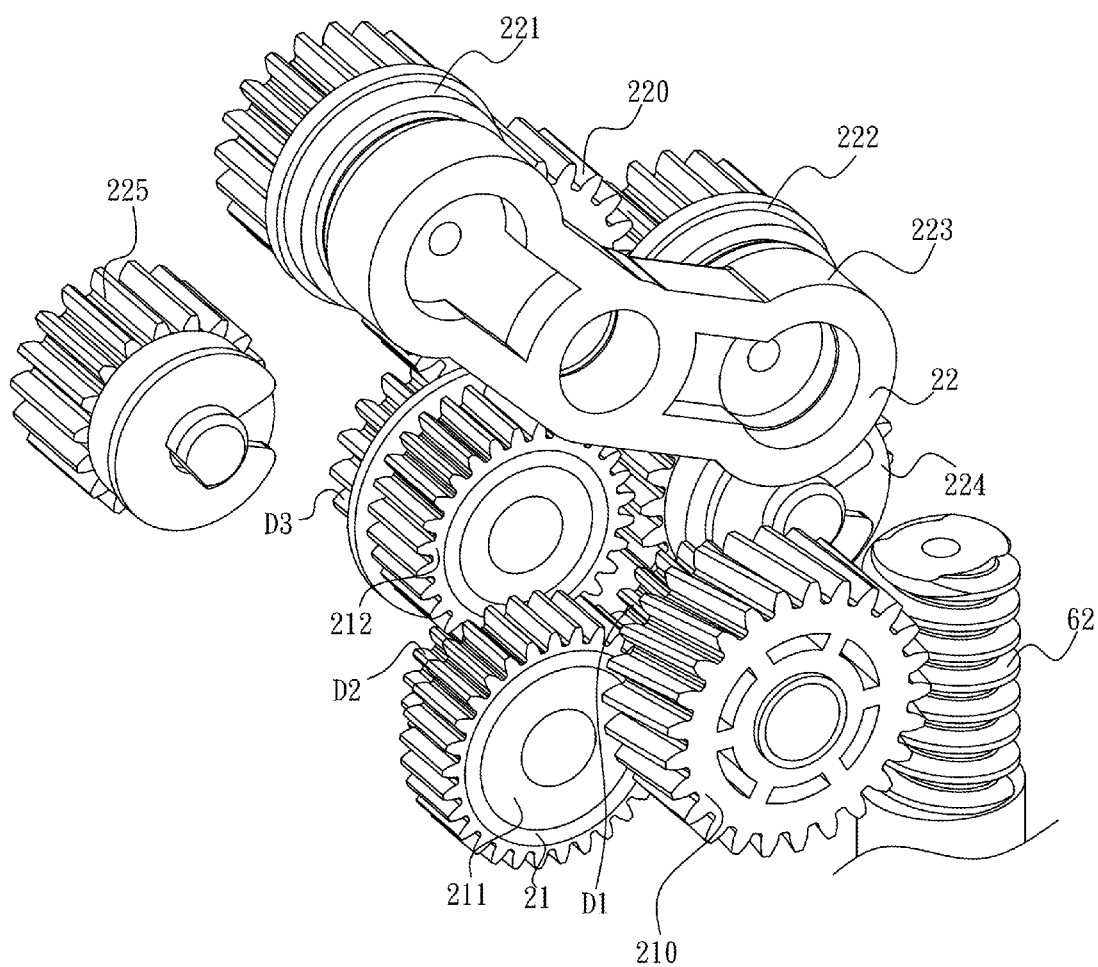
FIG. 2 is a perspective view of a gear assembly of the paper pickup mechanism shown in FIG. 1.

Referring to FIG. 2, the first engaged gear assembly 21 includes a turbine 210, a first engaged gear 211 and a second engaged gear 212. A rear side of the turbine 210 is provided with a first driven gear D1 integrated with the turbine 210 and engaged with the first engaged gear 211. A rear side of the first engaged gear 211 is provided with a second driven gear D2 integrated with the first engaged gear 211 and engaged with the second engaged gear 212.

The second engaged gear assembly 22 includes a rotating gear 220, a third engaged gear 221, a fourth engaged gear 222, a swing arm 223, a rolling gear 224 and a lifting gear 225. The rotating gear 220 is mounted between the front wall 11 of the frame 10 and a middle of the swing arm 223. The third engaged gear 221 and the fourth engaged gear 222 are mounted to two ends of the swing arm 223 and located at two opposite sides of the rotating gear 220. The third engaged gear 221 and the fourth engaged gear 222 are engaged with the rotating gear 220 respectively. A rear side of the second engaged gear 212 is provided with a third driven gear D3 integrated with the second engaged gear 212 and engaged with the rotating gear 220. The rolling gear 224 is rotatably mounted to the front wall 11 of the frame 10 and located in front of the front wall 11 under the fourth engaged gear 222. A rear side of the rolling gear 224 protrudes rearward and penetrates through the front wall 11 to form a rolling cylinder 2240 (referring to FIG. 5). The lifting gear 225 is located under the third engaged gear 221. The swing arm 223 can swing up and down by the rotation drive of the rotating gear 220 to realize the engagement of the third engaged gear 221 and the lifting gear 225 or the engagement of the fourth engaged gear 222 and the rolling gear 224.

Figure 3:
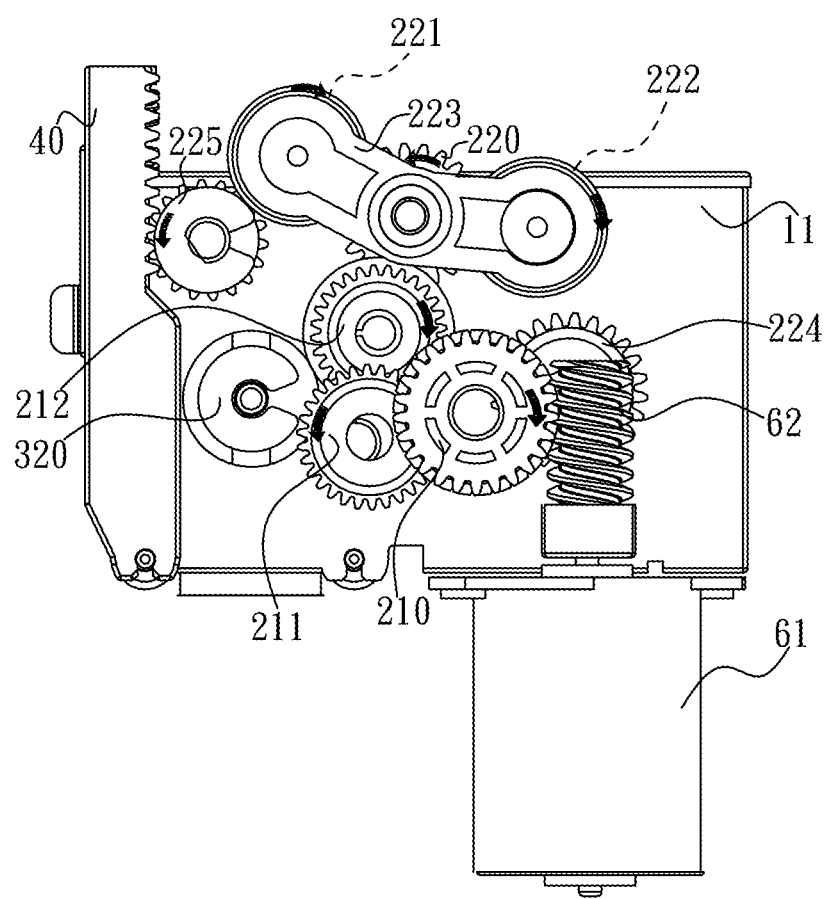
FIG. 3 is an abridged general view of the gear assembly driving a lifting cover of the paper pickup mechanism shown in FIG. 1.
Figure 4:
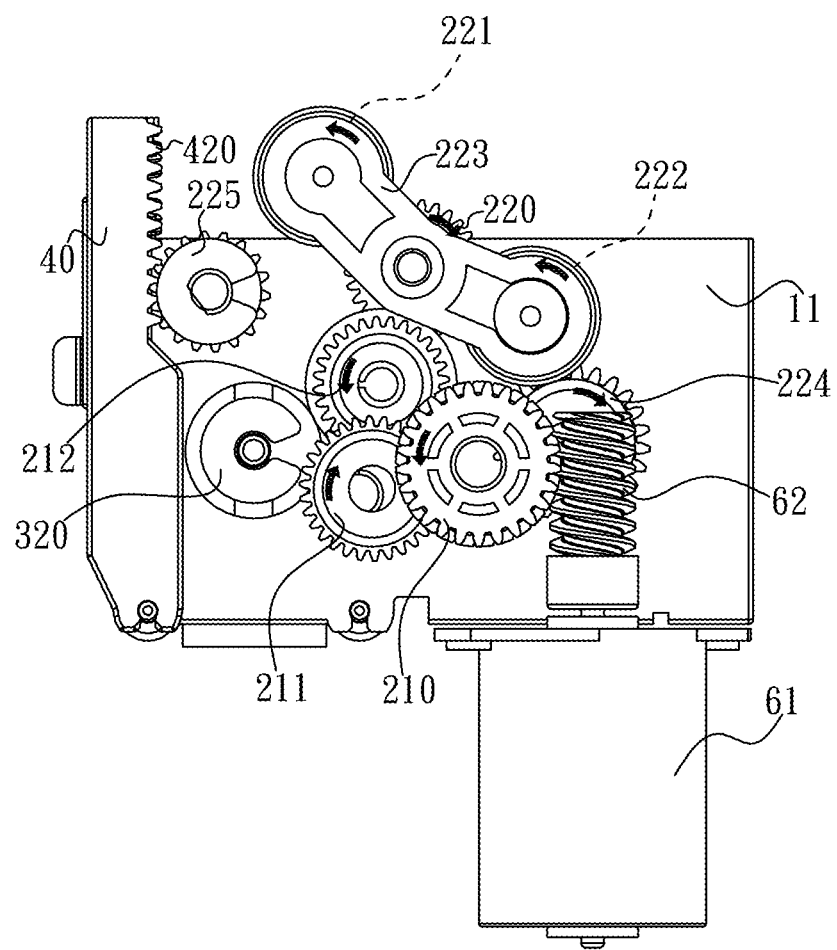
FIG. 4 is an abridged general view of the gear assembly driving a roller assembly of the paper pickup mechanism shown in FIG. 1.

In detail, referring to FIG. 3, when the turbine 210 is rotated in clockwise direction, under the influence of gear transmission principle the rotating gear 220 is rotated in counterclockwise direction to lift the third engaged gear 221 down so as to be engaged with the lifting gear 225. Referring to FIG. 4, when the turbine 210 is rotated in counterclockwise direction, under the influence of gear transmission principle the rotating gear 220 is rotated in clockwise direction to lift the fourth engaged gear 222 down so as to be engaged with the rolling gear 224.

Figure 5:
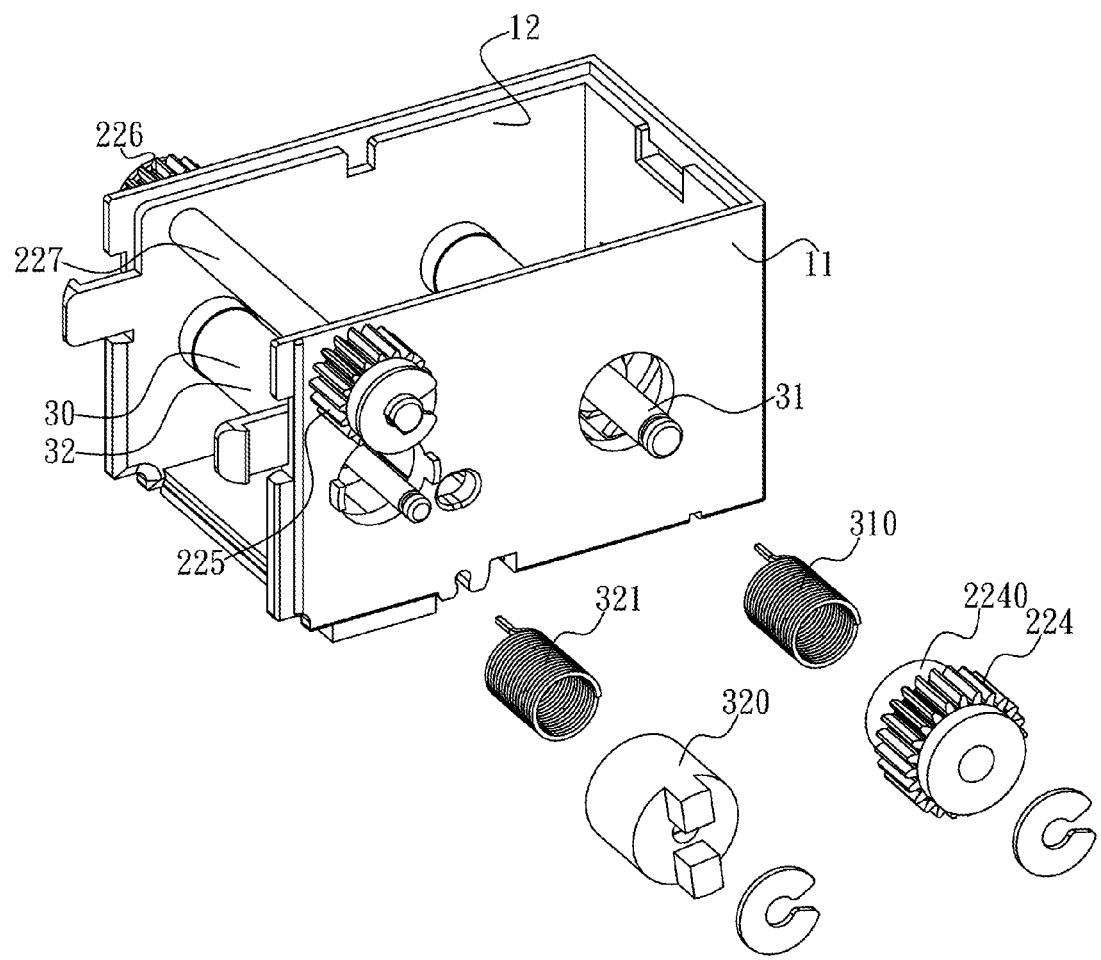
FIG. 5 is an exploded, perspective view of the roller assembly of the paper pickup mechanism shown in FIG. 1.

Referring to FIG. 5, an outside of the rear wall 12 of the frame 10 is equipped with an assisted lifting gear 226. The assisted lifting gear 226 co-works with the lifting gear 225 to drive the lifting cover 40. A connecting rod 227 is mounted in the frame 10 and penetrates through the front wall 11 and the rear wall 12 to connect with the lifting gear 225 and the assisted lifting gear 226.

Referring to FIG. 5 again, the roller assembly 30 includes a receive roller 31 and a release roller 32. The receive roller 31 and the release roller 32 are mounted between the front wall 11 and the rear wall 12 of the frame 10 and apart parallel to each other. The release roller 32 is close to the lifting cover 40. A front end of the receive roller 31 is inserted in the rolling cylinder 2240. A first one-way torsional spring 310 is set between the receive roller 31 and the rolling cylinder 2240 to limit the receive roller 31 to rotate in clockwise direction only. A front end of the release roller 32 is sheathed with a shaft sleeve 320 mounted through the front wall 11 of the frame 10. A second one-way torsional spring 321 is set between the release roller 32 and the shaft sleeve 320 to limit the release roller 32 to rotate in counterclockwise direction only.

Referring to FIG. 1, the lifting cover 40 is mounted to two ends of the front wall 11 and the rear wall 12 of the frame 10 near the release roller 32 and can slide up and down parallel to the release roller 32. The lifting cover 40 has a lifting plate 41 and two opposite edges of the lifting plate 41 protrude sideward to form a pair of side plates 42. A free side edge of each side plate 42 is provided with a plurality of engaged teeth 420.

The two ends of the front wall 11 and the rear wall 12 mounted with the lifting cover 40 protrude towards the lifting cover 40 to form a pair of guiding arms 110 and the free end of each guiding arm 110 is designed with a wedge-shape restraining lump 111. A pair of through grooves 410 is vertically opened in the lifting plate 41 of the lifting cover 40 and corresponds to the guiding arms 110 of the front wall 11 and the rear wall 12 of the frame 10. The guiding arms 110 pass through the through grooves 410 of the lifting cover 40 and the wedge-shape restraining lumps 111 are against the outside of the lifting plate 41 of the lifting cover 40. The lifting gear 225 and the assisted lifting gear 226 are engaged with the engaged teeth 420 of the two side plates 42 of the lifting cover 40 to lift the lifting cover 40 up and down. Bottom ends of the two side plates 42 protrude downward to form a pair of pivoting portions 421.

A top edge of the lifting plate 41 of the lifting cover 40 is protruded sideward to form a top plate 411. A spring 412 is mounted between the top plate 411 of the lifting cover 40 and the top wall 13 of the frame 10 to act as a return spring for the lifting cover 40.

The sponge 50 is mounted at a bottom of the frame 10 and parallels to the release roller 32 and the receive roller 31. The sponge 50 is located at a level position below that of the release roller 32 and the receive roller 31. A first roller 422 is mounted to the pivoting portions 421 of the lifting cover 40 and adjacent to one side edge of the sponge 50. A second roller 423 is mounted to the bottom of the frame 10 and adjacent to another side edge of the sponge 50.

The driving device 60 includes a motor 61 and a worm 62 mounted to the motor 61. The worm 62 is engaged with the turbine 210 to drive the turbine 210 to rotate in clockwise direction and in counterclockwise direction.

The paper pickup mechanism 1 picks up paper by virtue of the pickup tape T sticking the uppermost piece of paper thereon to separate the uppermost piece of paper from others.

Referring to FIG. 6, the pickup tape T is mounted to the release roller 32. The free end of the pickup tape T successively rounds the first roller 422, the bottom face of the sponge 50 and the second roller 423 and then is mounted to the receive roller 31. The stick face of the pickup tape T against the sponge 50 is exposed outward and opposite to the sponge 50.

Referring to FIGS. 3 to 5, in use of the paper pickup mechanism 1, firstly, the motor 61 of the driving device 60 rotates in clockwise direction and drives the worm 62 to rotate in clockwise direction. The worm 62 engaged with the turbine 210 drives the turbine 210 to rotate in clockwise direction. Under the influence of gear transmission principle the swing arm 223 is swung in counterclockwise direction to engage the third engaged gear 221 with the lifting gear 225, and the third engaged gear 221 rotates in clockwise direction and drives the lifting gear 225 and the assisted lifting gear 226 to rotate in counterclockwise direction (referring to FIG. 3). The counterclockwise rotation of the lifting gear 225 and the assisted lifting gear 226 lifts the lifting cover 40 down. Due to the first one-way torsional spring 310, the receive roller 31 doesn't rotate in counterclockwise direction, and a bottom end of the lifting cover 40 is against the pickup tape T and pulls down the pickup tape T by the lifting cover 40 sliding down. Secondly, the motor 61 of the driving device 60 rotates in counterclockwise direction and drives the worm 62 to rotate in counterclockwise direction. The worm 62 engaged with the turbine 210 drives the turbine 210 to rotate in counterclockwise direction. Under the influence of gear transmission principle the swing arm 223 is swung in clockwise, direction to engage the fourth engaged gear 222 with the rolling gear 224, and the fourth engaged gear 222 rotates in counterclockwise direction and drives the rolling gear 224 to rotate in clockwise direction (referring to FIG. 4). The clockwise rotation of the rolling gear 224 drives the receive roller 31 to rotate in clockwise direction so as to receive the pulled pickup tape T and the pickup tape T under the sponge 50 has been changed to a new length to stick another uppermost piece of paper.

As described above, the paper pickup mechanism 1 of the embodiment of the present invention realizes the process of picking up paper by the pickup tape T, and utilizes the cooperation of the release roller 32 and the receive roller 31 to make the pickup tape T pass under the sponge 50, so as to change the pickup tape T against the sponge 50 to a new length in time, so that make sure the pickup tape T under the sponge 50 keeps stickiness and can always pick up paper. Furthermore, the pickup tape T under the sponge 50 always sticks the uppermost piece of paper to ensure the paper pickup mechanism 1 picks up paper piece by piece.

What is claimed is:

1. A paper pickup mechanism used with a pickup tape, comprising:
   a frame;
   a release roller and a receive roller rotatably mounted in the frame and apart paralleling to each other;
   a sponge mounted at a bottom of the frame and paralleling to the release roller and the receive roller, the sponge being located at a level position below that of the release roller and the receive roller; and
   a lifting cover which is mounted to one side of the frame near the release roller and can slide up and down parallel to the release roller, a bottom end of the lifting cover being against the pickup tape and pulling down the pickup tape by the lifting cover sliding down;

wherein the pickup tape is mounted to the release roller, the free end of the pickup tape rounds the bottom face of the sponge and is mounted to the receive roller, the stick face of the pickup tape against the sponge is exposed outward and opposite to the sponge.

2. The paper pickup mechanism as claimed in claim 1, wherein a first roller is mounted to the bottom end of the lifting cover and adjacent to one side edge of the sponge, a second roller is mounted to the bottom of the frame and adjacent to another side edge of the sponge, the free end of the pickup tape successively rounds the first roller, the bottom face of the sponge and the second roller and then is mounted to the receive roller.

3. The paper pickup mechanism as claimed in claim 2, wherein the frame has a front wall and a rear wall, the release roller and the receive roller are mounted between the front wall and the rear wall, and the lifting cover is mounted to two ends of the front wall and the rear wall.

4. The paper pickup mechanism as claimed in claim 3, further comprising a rolling gear rotatably mounted to the front wall of the frame and located in front of the front wall, a rear side of the rolling gear protrudes rearward and penetrates through the front wall to form a rolling cylinder, a front end of the receive roller is inserted in the rolling cylinder, the paper pickup mechanism further includes a second engaged gear assembly mounted to the front wall of the frame and located in front of the front wall, the second engaged gear assembly includes a rotating gear, a third engaged gear, a fourth engaged gear, a swing arm and a lifting gear, the rotating gear is mounted between the front wall of the frame and a middle of the swing arm, the third engaged gear and the fourth engaged gear are mounted to two ends of the swing arm and located at two opposite sides of the rotating gear, the third engaged gear and the fourth engaged gear are engaged with the rotating gear respectively, the lifting cover has a lifting plate and two opposite edges of the lifting plate protrude sideward to form a pair of side plates, a free side edge of each side plate is provided with a plurality of engaged teeth, the lifting gear is located under the third engaged gear and is engaged with the engaged teeth of the lifting cover, the rolling gear is located under the fourth engaged gear, the swing arm can swing up and down by the rotation drive of the rotating gear to realize the engagement of the third engaged gear and the lifting gear or the engagement of the fourth engaged gear and the rolling gear.

5. The paper pickup mechanism as claimed in claim 4, wherein a top edge of the lifting plate protrudes sideward to form a top plate, the frame further has a top wall striding on the front wall and the rear wall, a spring is mounted between the top plate of the lifting cover and the top wall of the frame.

6. The paper pickup mechanism as claimed in claim 5, wherein a first one-way torsional spring is set between the receive roller and the rolling cylinder.

7. The paper pickup mechanism as claimed in claim 6, wherein a front end of the release roller is sheathed with a shaft sleeve mounted through the front wall of the frame, a second one-way torsional spring is set between the release roller and the shaft sleeve.

8. The paper pickup mechanism as claimed in claim 7, wherein the receive roller rotates in clockwise direction only and the release roller rotates in counterclockwise direction only.

\* \* \* \* \*